United States Patent
Flik et al.

(10) Patent No.: US 7,377,173 B2
(45) Date of Patent: May 27, 2008

(54) HYDROSTATIC PRESSURE DETERMINATION IN A HIGH-PRESSURE A RESERVOIR (COMMON RAIL) BY MEANS OF ULTRASONIC ECHO TIME MEASUREMENT

(75) Inventors: Gottfried Flik, Leonberg (DE); Stefan Muelders, Ditzingen-Heimerdingen (DE); Michael Stumber, Korntal-Muenchingen (DE); Oliver Stoll, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 47 days.

(21) Appl. No.: 10/547,709

(22) PCT Filed: Oct. 21, 2003

(86) PCT No.: PCT/DE03/03484

§ 371 (c)(1),
(2), (4) Date: Sep. 2, 2005

(87) PCT Pub. No.: WO2004/079318

PCT Pub. Date: Sep. 16, 2004

(65) Prior Publication Data
US 2006/0201254 A1   Sep. 14, 2006

(30) Foreign Application Priority Data
Mar. 6, 2003   (DE) .............................. 103 10 114

(51) Int. Cl.
*G01L 11/00* (2006.01)
(52) U.S. Cl. ...................................................... 73/703
(58) Field of Classification Search .................. 73/703, 73/597, 628, 665
See application file for complete search history.

(56) References Cited

U.S. PATENT DOCUMENTS

| | | | | |
|---|---|---|---|---|
| 3,977,252 A | * | 8/1976 | Krylova et al. | 73/703 |
| 4,981,045 A | * | 1/1991 | Mountford | 73/644 |
| 5,317,111 A | * | 5/1994 | Orban et al. | 181/105 |
| 5,329,821 A | * | 7/1994 | Birnbaum et al. | 73/861.28 |
| 5,354,956 A | * | 10/1994 | Orban et al. | 181/105 |
| 5,741,971 A | * | 4/1998 | Lacy | 73/597 |
| 6,650,280 B2 | * | 11/2003 | Arndt et al. | 342/124 |
| 2004/0187569 A1 | * | 9/2004 | Rollwage et al. | 73/290 V |

FOREIGN PATENT DOCUMENTS

| | | |
|---|---|---|
| DE | 100 18 665 A1 | 10/2001 |
| DE | 100 35 816 A1 | 1/2002 |
| EP | 1 327 765 A2 | 7/2003 |
| JP | 2001-116640 | 4/2001 |
| JP | 2002-296133 | 10/2002 |

\* cited by examiner

*Primary Examiner*—Andre J Allen
(74) *Attorney, Agent, or Firm*—Ronald E. Greigg

(57) ABSTRACT

The invention relates to an economical pressure measuring device as well as to a favorable method for pressure determination, with which a pressure measurement can be performed from outside the high-pressure container. To that end, the device comprises an ultrasound transmitter mounted outside the pressure container and an ultrasound receiver by means of which transmitter and receiver the transit time of an ultrasonic pulse traveling through the liquid contained in the high-pressure container can be ascertained, and the method comprises generating an ultrasonic pulse outside the high-pressure container measuring the time that the ultrasonic pulse requires to traverse a defined distance calculating the pulse speed of the pulse in the liquid; and from that determining the pressure in the liquid.

19 Claims, 1 Drawing Sheet

HYDROSTATIC PRESSURE DETERMINATION IN A HIGH-PRESSURE A RESERVOIR (COMMON RAIL) BY MEANS OF ULTRASONIC ECHO TIME MEASUREMENT

CROSS-REFERENCE TO RELATED APPLICATIONS

This application is a 35 USC 371 application of PCT/DE 03/03484 filed Oct. 21, 2003.

BACKGROUND OF THE INVENTION

1. Field of the Invention

The invention relates to a device for hydrostatic pressure determination using an ultrasonic transmitter and an ultrasonic receiver, and to a method for determining the hydrostatic pressure using the device.

2. Prior Art

Determining the pressure of liquids in high-pressure containers is necessary above all in measuring the diesel fuel pressure in common rails or in gasoline injection technology, in which liquid pressures of up to 2000 bar occur. In other areas of industry as well, pressures of liquid in high-pressure containers are measured.

Various pressure measuring techniques for this are known.

As one example, it is possible to integrate a diaphragm or other deformable body, as a pressure sensor, with the wall of the high-pressure container, and the deflection of this sensor is then measured on the piezoresistive principle, for instance with a rail pressure sensor, or capacitively.

A pressure sensor may also be mounted entirely inside the high-pressure chamber and thus directly in the medium to be measured, as is the case for example in "vibrating cylinder" measurement or in the use of piezoresistive materials, such as highly porous $RuO_2$, which alters its electrical transporting properties under the influence of hydrostatic pressures.

The disadvantage of the known pressure-measuring techniques is the necessity for seals. In the case where the sensor is integrated with the wall of the high-pressure container, the entire surroundings of the sensor must be sealed off from the exterior; otherwise, at least high-pressure contact leadthroughs are required.

Because of the problems of tightness in high-pressure containers, it is appropriate for there to be as few interfaces with the exterior as possible. If the contacts are the only elements that must be passed through the wall, then the problem is indeed reduced but not yet eliminated. Moreover, measuring methods as vibrating cylinder measurement are complicated and expensive and thus are poorly suited to use in a mass-produced article, such as a conventional Diesel common rail.

SUMMARY AND OBJECTS OF THE INVENTION

A principal object of the invention is to introduce an economical pressure measuring device and a favorable method for pressure determination, by means of which a pressure measurement can be performed from outside the high-pressure container.

This object is attained by providing that a device comprising an ultrasound transmitter, mounted outside the pressure container, and an ultrasound receiver, by means of which transmitter and receiver the transit time of an ultrasonic pulse that passes through the liquid contained in the high-pressure container can be ascertained, and a method in which an ultrasonic pulse is generated outside the high-pressure container; the time that the ultrasonic pulse requires to traverse a defined distance is measured; the pulse speed is calculated; and from that the pressure in the liquid is determined.

The pressure measurement principle is based on the known relationship between ultrasonic speed and the pressure in the vehicle medium. Thus if the transit time of an ultrasonic pulse is measured, then a conclusion can be drawn as to the speed of sound and thus to the pressure of the vehicle medium. A common rail, for test purposes, is filled for instance with standard test oil in accordance with ISO 4113. The requisite measurement means are standard components. They can therefore be procured inexpensively.

The primary advantage of the invention, however, resides in the fact that the ultrasonic wave is generated and measured outside the high-pressure chamber. Thus there is no need to incorporate a means of direct high-pressure access, which is a problematic interface in terms of sealing, into the high-pressure chamber.

In the transit time measurement, an averaging measurement is implicitly made over the entire travel distance. It is therefore appropriate to dispose the transmitter and receiver such that averaging is done over the entire volume of the high-pressure container. The measurement is unimpeded by local, individual pressure peaks of the kind that can occur in the vicinity of injector lead lines, for instance.

The components that can be used have very tiny dimensions. Hence there is great flexibility in terms of mounting the ultrasound transmitter and the receiver, and in particular the entire measuring probe can be integrated with a rail.

For a good signal-to-noise ratio, it is important that the greatest possible proportion of the ultrasonic wave generated in fact travel through the medium to be measured. It is therefore advantageous if the ultrasound transmitter and the ultrasound receiver can be coupled to the high-pressure container via an ultrasound-conducting medium, such as rubber, gel or adhesive.

The measurement device is advantageously further embodied by mounting a defined reflective surface inside the high-pressure container. The transit distance of the ultrasonic pulse can be lengthened by deflection at the reflective surface, making the measurement more exact. Moreover, the ultrasound transmitter and the ultrasound receiver can be disposed close together, or the ultrasound transmitter simultaneously functions as a receiver, making for an even more-compact design of the device. The reflective surface should ideally be oriented as perpendicularly as possible to the walls of the rail tube, so that ideal reflection conditions exist for reflection at a reflection angle of 0°. In that case, unwanted scattering effects, which could cause a loss of the intensity of the ultrasonic pulse, do not occur. The reflective surface may simply be the end of the rail, or a connection screw at the end of the rail.

The known relationship between the speed of sound and the pressure in a defined medium depends on the temperature of the medium. If an absolute pressure determination is to be performed, it is therefore advantageous for the temperature to be known and for the device to be equipped with one or more temperature sensors. The temperature measurement can be done by disposing thermosensors at one or more points on the pressure container, or rail. In the case of the rail, it can be assumed that the temperature of the medium is substantially constant along the tube. The primary temperature differences exist at the interface between high and low pressure of the outlet throttle, where the liquid can expand. The ultrasonic pulse does not travel through this region, since the pressure is to be measured in the high-pressure region. In most cases, it therefore suffices to mount a temperature sensor in the vicinity of the ultrasound transmitter. If a separately mounted transmitter and receiver are employed, then two thermosensors may also be mounted and their findings averaged.

Alternatively to determining the pressure, it is also possible, for defining the absolute temperature, to ascertain the ultrasonic speed in a reference volume that has a fixed reference pressure. The device is therefore advantageously further refined if it is equipped with such a reference volume, or if such a reference volume is mounted in the measurement chamber. To that end, an elongated cavern may be disposed on the tube wall of the common rail, parallel to the rail conduit, the cavern again containing the medium to be measured or a reference, at ambient pressure or at a defined pressure of 1 bar.

The outgoing ultrasonic pulse is then split into a reference pulse and a measurement pulse; the reference pulse travels through the cavern, and the measurement pulse travels through the volume actually to be measured. Since the cavern is smaller than the common rail, a receiver can first detect the transit time of the reflected reference pulse and later the transit time of the measurement pulse. By an adjustment of the ascertained values with the known relationship between pressure and the speed of sound at various temperatures in a defined medium, the pressure is then ascertained.

The relationship between the speed of sound, the pressure, and the temperature is known for various media that can be considered as products for filling high-pressure containers, particularly for common rails. If the temperature, the transit time of an ultrasonic pulse in a reference chamber with calibrated pressure and calibrated liquid are measured, then a conclusion can be drawn about the product filling the common rail, from the ascertainment of the speed of sound of the ultrasonic pulse in the common rail. The measuring device is accordingly advantageously refined by equipping it with at least one temperature sensor and the reference volume with a reference liquid at reference pressure.

With such a device, it would for instance be possible to ascertain which fuel, such as summer-weight or winter-weight Diesel, was put in the tank. This information can be used, among other purposes, for engine control.

The adjustment of the measured data with the reference values can be done outside the device, or advantageously the device is equipped with a module that performs the evaluation or adjustment.

Methods for determining pressure values in common rails or in direct gasoline injection, in which the devices described above are employed, are also achieved.

BRIEF DESCRIPTION OF THE DRAWINGS

Further advantageous features of the invention will become apparent from the ensuing description, taken in conjunction with the drawings, in which.

DESCRIPTION OF THE PREFERRED EMBODIMENTS

Figure 1:
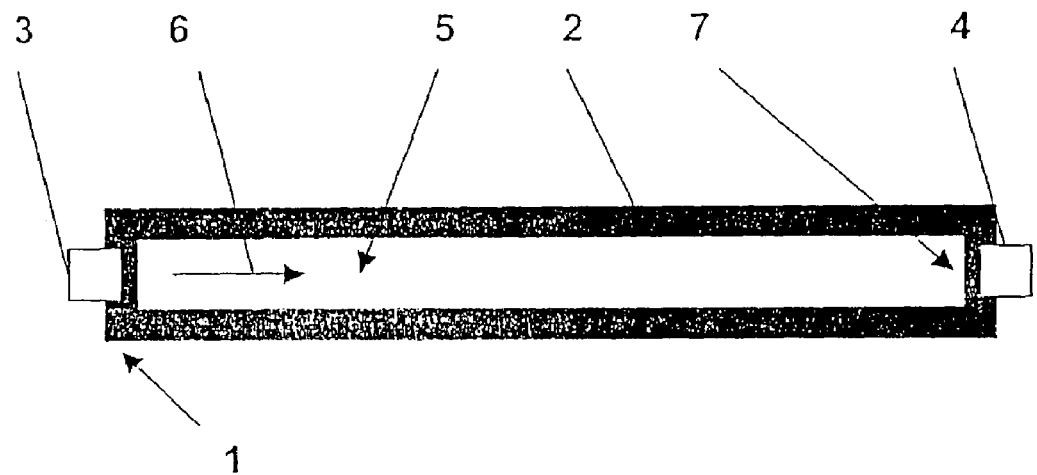
FIG. 1 is a section through a schematic illustration of a common rail, or similar type of high-pressure container, with a device for pressure determination, comprising an ultrasound transmitter and an ultrasound receiver that are disposed opposite one another.

In FIG. 1, a section is shown through a schematic illustration of a device 1 for pressure determination in a common rail 2; the device comprises an ultrasound transmitter 3 and an ultrasound receiver 4, which are disposed opposite one another. The ultrasound transmitter 3 generates ultrasonic pulses, which travel through the medium 5, contained in the common rail 2, in the longitudinal direction 6 and are picked up by an ultrasound receiver 4 on the end 7 opposite from the ultrasound transmitter 3.

Figure 2:
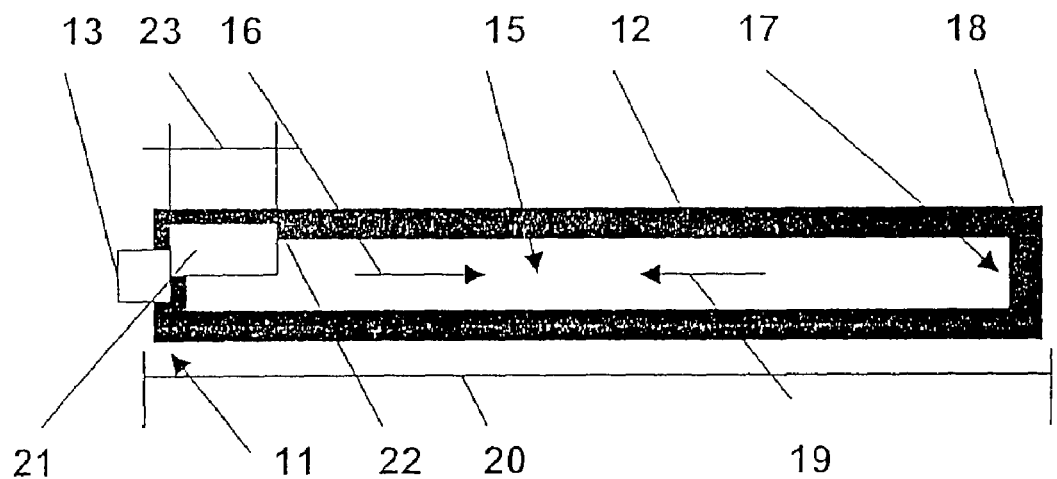
FIG. 2 is a section through a schematic illustration of a common rail or similar high-pressure container, with a device for pressure determination having a reflective surface and a reference volume.

In FIG. 2, a section is shown through a schematic illustration of a device 11 for pressure determination in a common rail 12, in which the ultrasound transmitter 13 is simultaneously used as an ultrasound receiver 13. In this exemplary embodiment, the ultrasound transmitter 13 once again transmits an ultrasonic pulse, of which one portion travels as a measurement pulse through the medium 15 in the common rail 12 in the longitudinal direction 16 and is reflected at a reflective surface 18, mounted on an end 17 opposite from the ultrasound transmitter 13. The ultrasonic pulse thereupon travels back through the common rail 12 in the reverse direction 19 and is then detected by the ultrasound receiver 13. If the product filling the container is the standard medium, i.e., test oil meeting ISO 4113, and the temperature is 20° C., then from the known relationship between pressure and the speed of sound, for a rail length 20 of 300 mm, a transit time of 0.44 ms is found. Since a new pulse cannot be generated until after the arrival of the previous pulse, a repetition rate of approximately 2.2 kHz is possible, under the conditions named. In the least favorable measuring region, if a temperature of 120° C. prevails, then the transit time at 0 bar increases to 0.6 ms, thus reducing the repetition rate to 1.6 kHz.

A second portion of the ultrasonic pulse, as a reference pulse, does not travel the full length 20 of the common rail 12 but instead is fed into a reference volume 21, in which there is a medium at a defined pressure. The reference volume is likewise equipped with a reflective surface 22, so that the second ultrasonic pulse portion, after travelling through the reference volume 21, is likewise reflected and detected by the ultrasound receiver 13. Since the length 23 of the reference volume 21 is substantially shorter than the length 20 of the common rail 12, the reference pulse and the measurement pulse can be unambiguously identified.

The measurement of the reference pulse serves to determine the pressure independently of the temperature, or if volume 21 is filled with a reference medium, it serves to determine the property of the medium 15.

The foregoing relates to preferred exemplary embodiments of the invention, it being understood that other variants and embodiments thereof are possible within the spirit and scope of the invention, the latter being defined by the appended claims.

The invention claimed is:

1. A device for hydrostatic pressure determination in a common rail or in a direct gasoline injection system, which common rail or direct gasoline injection system includes liquid in a high-pressure container, comprising an ultrasound transmitter (3, 13), mounted outside the high-pressure container of the common rail or direct gasoline injection system, and an ultrasound receiver (4, 13), the transmitter and receiver being operable to ascertain the transit time of an ultrasonic pulse passing through the liquid (5, 15) contained in the high-pressure container (2, 12) of the common rail or direct gasoline injection system.

2. The device of claim 1, wherein
the ultrasound transmitter (3, 13) and ultrasound receiver (4, 13) are coupled to the high-pressure container (2, 12) via an ultrasound-conducting medium, such as rubber, gel or adhesive.

3. The device of claim 1, further comprising a defined reflective surface (18) mounted inside the high-pressure container (2, 12).

4. The device of claim 2, further comprising a defined reflective surface (18) mounted inside the high-pressure container (2, 12).

5. The device of claim 1, further comprising at least one temperature sensor.

6. The device of claim 2, further comprising at least one temperature sensor.

7. The device of claim 3, further comprising at least one temperature sensor.

8. The device of claim 1, further comprising at least one reference volume (21) which contains the same liquid as the liquid whose pressure is to be measured, wherein the liquid in the reference volume is at reference pressure.

9. The device of claim 2, further comprising at least one reference volume (21) which contains the same liquid as the liquid whose pressure is to be measured, wherein the liquid in the reference volume is at reference pressure.

10. The device of claim 3, further comprising at least one reference volume (21) which contains the same liquid as the liquid whose pressure is to be measured, wherein the liquid in the reference volume is at reference pressure.

11. The device c-f claim 4, further comprising at least one reference volume (21) which contains the same liquid as the liquid whose pressure is to be measured, wherein the liquid in the reference volume is at reference pressure.

12. The device of claim 1, further comprising at least one temperature sensor and one reference volume (21) containing a reference liquid at reference pressure.

13. The device of claim 2, further comprising at least one temperature sensor and one reference volume (21) containing a reference liquid at reference pressure.

14. The device of claim 3, further comprising at least one temperature sensor and one reference volume (21) containing a reference liquid at reference pressure.

15. The device of claim 1, further comprising an evaluation and/or adjustment module for comparison with one or more reference values.

16. A method for determining the hydrostatic pressure in a liquid-filled high-pressure container, the method comprising generating an ultrasonic pulse outside the high-pressure container (2, 12) and directing the pulse into the container;

providing a reflective surface in the container;

measuring the time that the ultrasonic pulse requires to traverse a defined distance (20, 23) up to the reflective surface (18, 22) and back again; and calculating the pulse speed in the liquid, and from that determining the pressure in the liquid.

17. A method for determining the hydrostatic pressure in a liquid-filled high-pressure container, the method comprising determining the temperature inside the high-pressure container (2, 12);

generating an ultrasonic pulse outside the high-pressure container (2, 12) and directing the pulse into the container;

measuring the time that the ultrasonic pulse requires to traverse a defined distance (20, 23) up to a defined reflective surface (18, 22) in the container and back again; and calculating the pulse speed in the liquid, and by the adjustment of the speed/pressure curve at the measured temperature, determining the pressure in the liquid.

18. A method for determining the hydrostatic pressure in a liquid-filled high-pressure container, the method comprising generating an ultrasonic pulse outside the high-pressure container (12) and directing the pulse into the container;

measuring the time that the pulse requires to traverse a reference chamber (21) at fixed pressure;

measuring the time that the ultrasonic pulse requires to traverse a defined distance (20) as far as a defined reflective surface (18) in the chamber and back again; and calculating the pulse speeds in both the reference chamber and the high-pressure chamber, and by the comparison of the values, determining the pressure in the liquid (16).

19. A method for determining the hydrostatic pressure in a liquid-filled high-pressure container, the method comprising determining the temperature inside the high-pressure container (12);

generating an ultrasonic pulse outside the high-pressure container (12) and directing the pulse into the container;

measuring the time that the pulse requires to traverse a reference chamber (21) at fixed pressure;

measuring the time that the ultrasonic pulse requires to traverse a defined distance (20) as far as a defined reflective surface (18) in the container and back again; and calculating the pulse speed in the liquid, and by the comparison of the speed/pressure curve at the measured temperature for various products for filling containers, determining the pressure of the material comprising the liquid (15).

\* \* \* \* \*